INVENTORS
Anthony James Mazzio
Lawrence A. Borneman
by McDougall, Hersh, Scott & Ladd
Attys

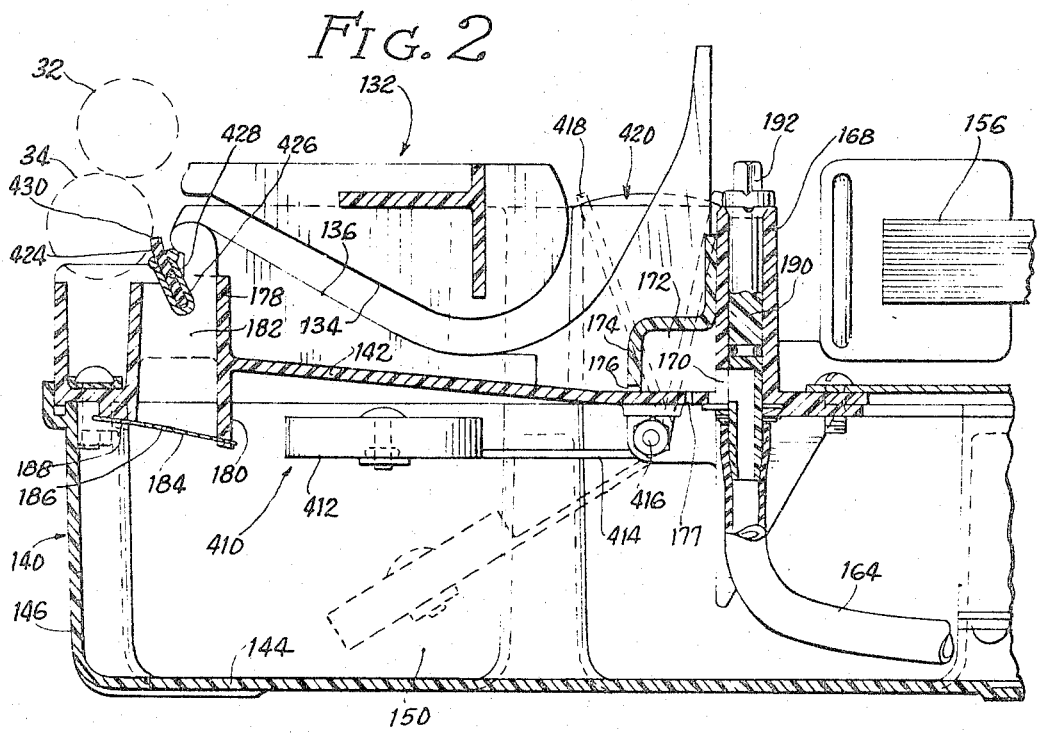
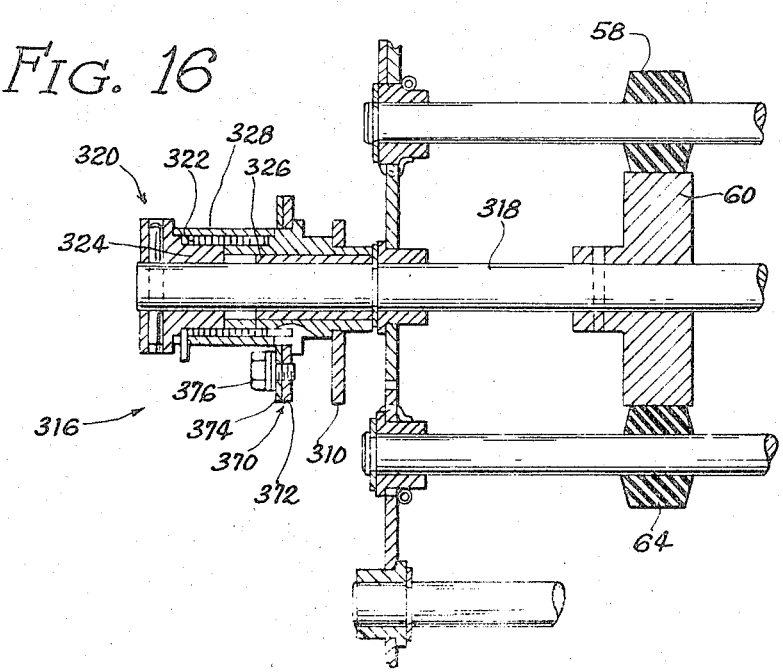

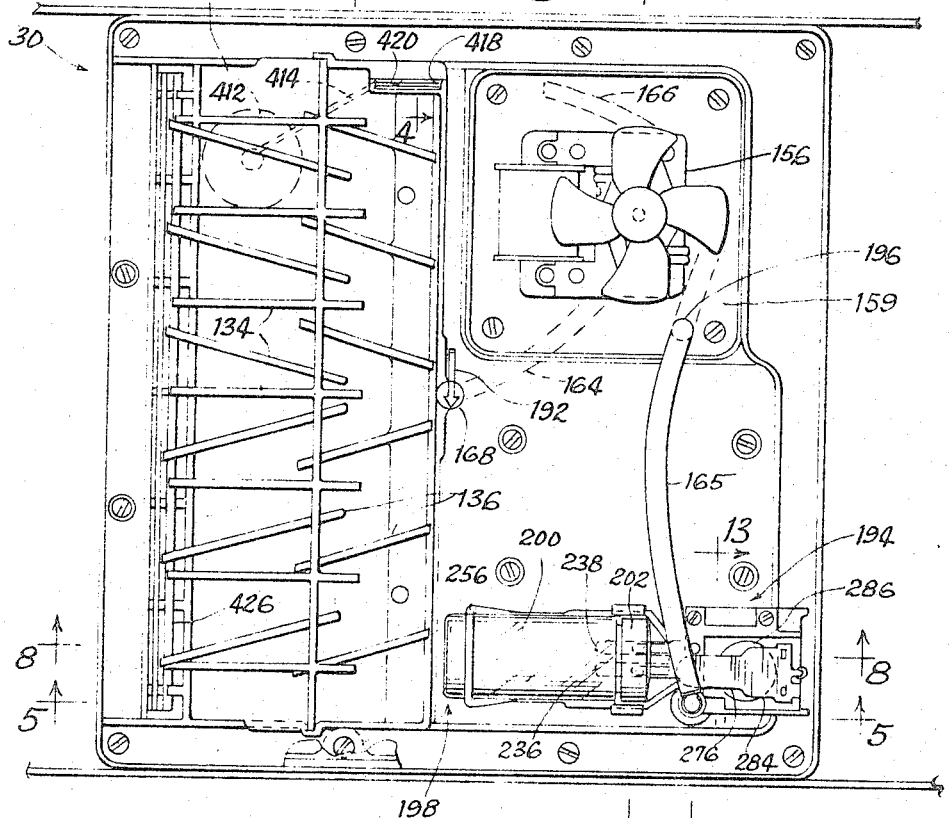
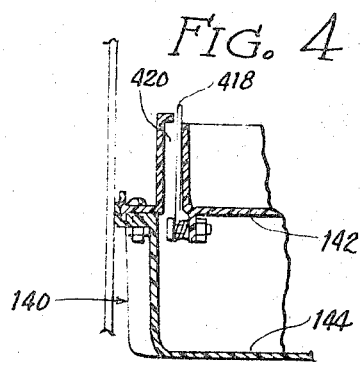
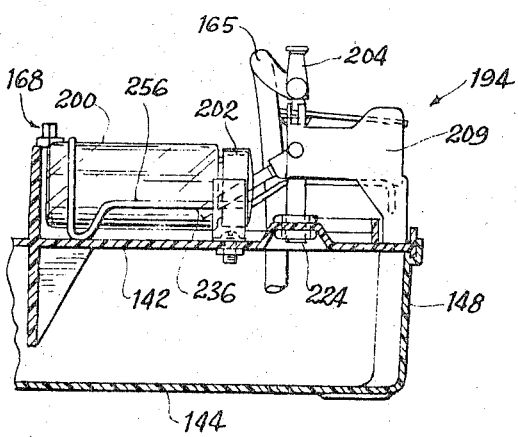

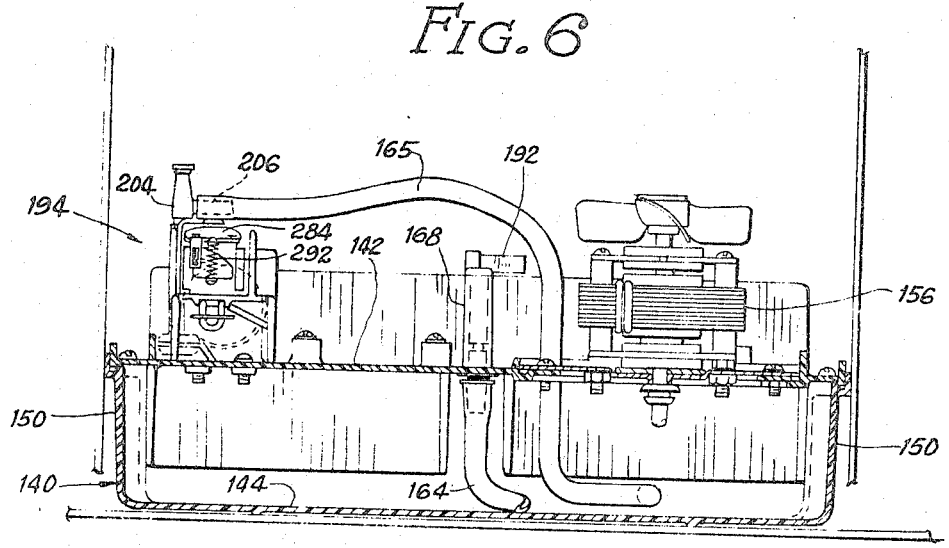
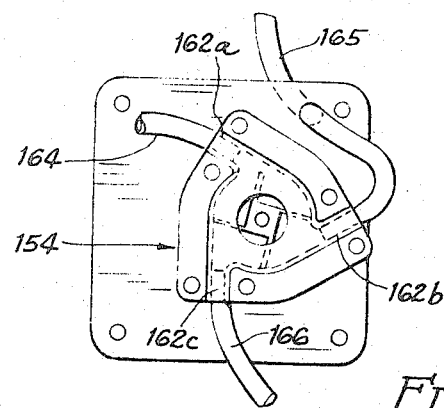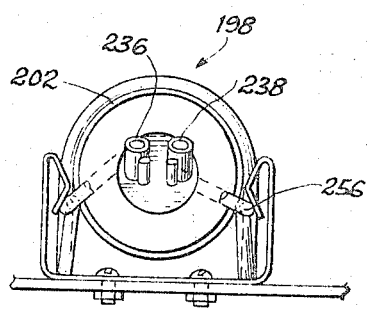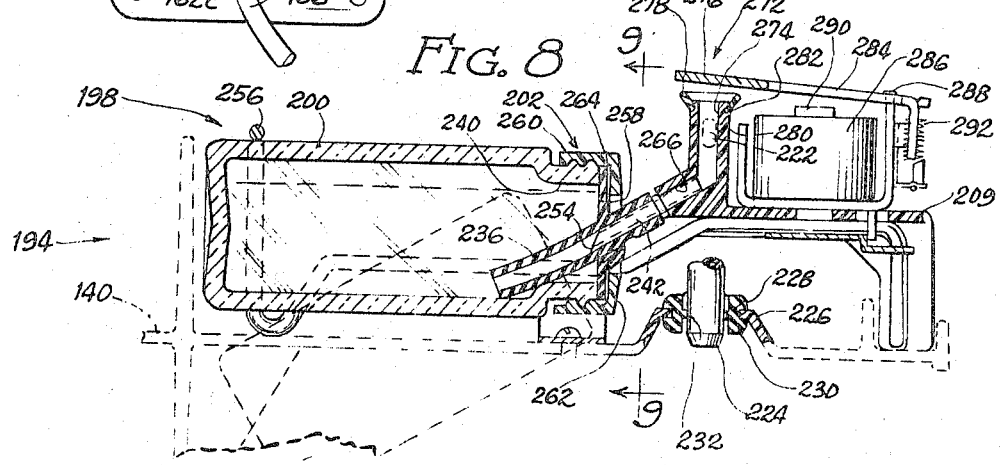

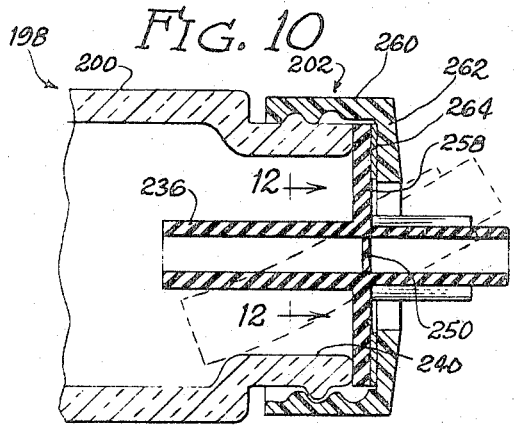
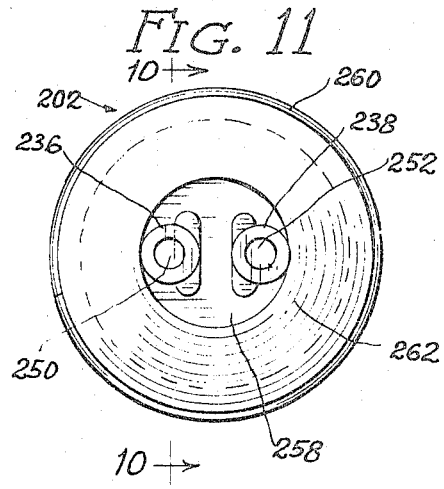
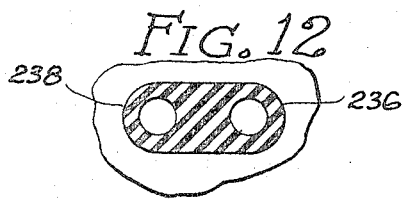
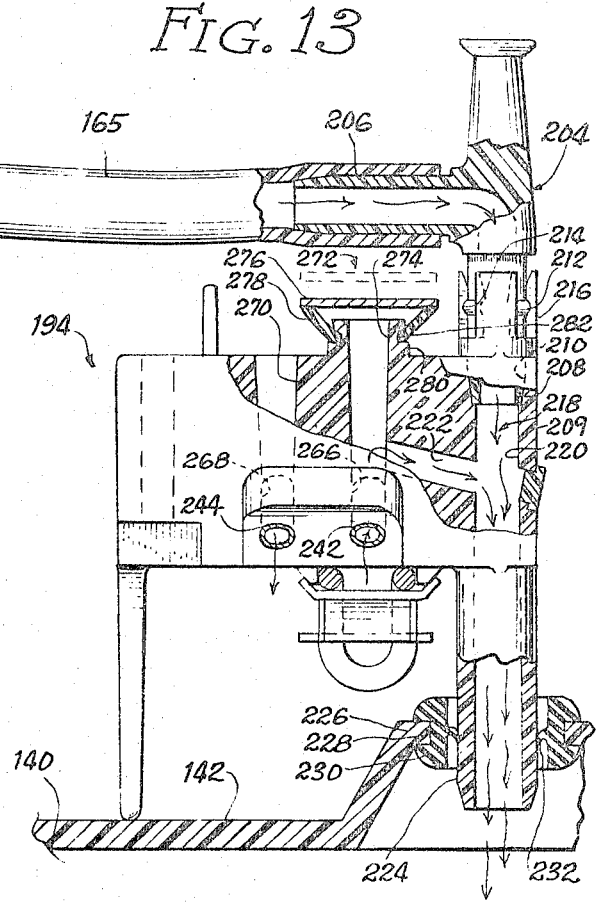

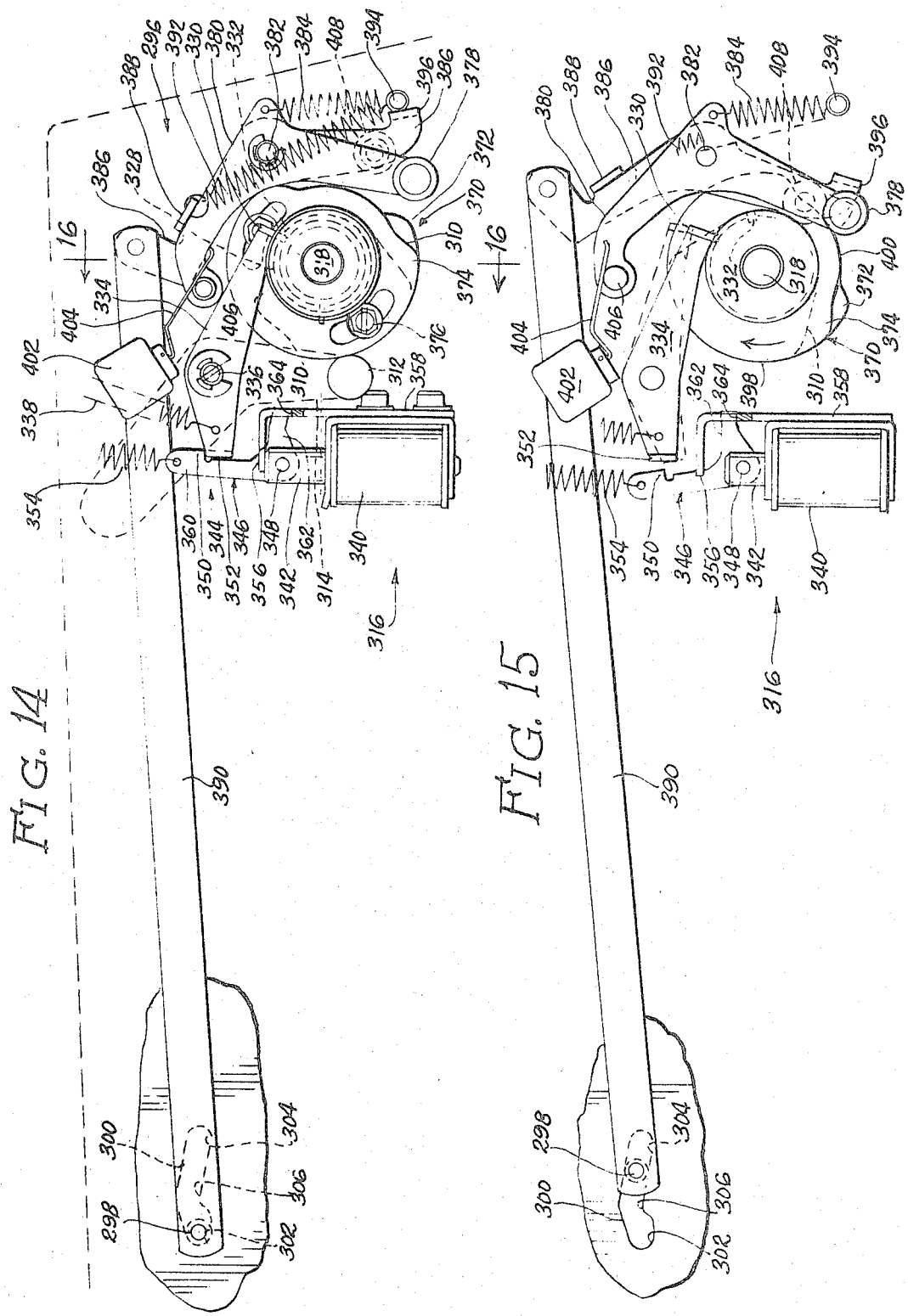

United States Patent Office 3,488,116
Patented Jan. 6, 1970

3,488,116
DEVELOPER MECHANISM FOR PHOTOCOPY
MACHINE
Anthony James Mazzio, Chicago, and Lawrence A.
Borneman, Lombard, Ill., assignors to A. B. Dick
Company, Niles, Ill., a corporation of Illinois
Filed Mar. 16, 1967, Ser. No. 623,667
Int. Cl. G03g 15/10
U.S. Cl. 355—10                    16 Claims

ABSTRACT OF THE DISCLOSURE

An electrostatic photocopy apparatus comprising a developing mechanism having a liquid developer tray above a closed supply tank with a pump to circulate the developer, an overflow drain conduit between the tray and the tank with a check valve to prevent spillage of the liquid, and an extra outlet from the pump into the tank to agitate the liquid. The photocopy apparatus further includes a power injection device to inject toner into the tank, a selectively operable timing device to actuate the injection device, a non-spill toner receptacle and squeeze rollers with a reversible rubber squeegee blade having two selectively usable scraping edges.

---

Certain features of the photocopy machine disclosed as an illustrative embodiment in this application are disclosed and claimed in the copending Mazzio application Ser. No. 569,402, filed Aug. 1, 1966, now Patent No. 3,343,834. Other features are disclosed and claimed in the copending application of Anthony James Mazzio and Louis G. Birr, Jr., on Feed Mechanism for Photocopy Machine or the like, Ser. No. 611,688, filed Jan. 25, 1967.

This invention relates to photocopy machines or the like, and pertains particularly to developer mechanisms utilizing a liquid developer.

Photocopy machines hase been provided in the prior art, whereby a copy sheet bearing an electrostatic latent image is directed through a developer mechanism which applies a liquid developer to the copy sheet. The liquid developer contains a toner which adheres to the electrostatic latent image and renders it visible. The excess liquid developer is then squeezed from the sheet, and the sheet is dried, to produce the finished photocopy. Such developer mechanisms are also applicable to facsimile machines in which an electrostatic latent image is produced on copy paper.

Some of the general objectives of the present invention are to provide a developer mechanism of this general character, having a developer tray, a supply tank, and a pump for circulating the liquid developer between the tank and the tray, with provision for closing the tank to prevent spillage and evaporation of the liquid therefrom; provision for vigorously agitating the liquid in said tank; provision for metering additional toner into the tank; provision for avoiding any spillage or leakage of the toner; and provision for extending the effectiveness and life of the squeegee blade which engages one of the squeeze rollers for removing the excess liquid from the copy sheets.

To accomplish these objectives, the present invention contemplates the provision of a closed supply tank with a shut-off valve between the circulating pump and the developer tray, and a check valve for the overflow drain conduit between the tray and the tank, to prevent spillage and evaporation of the liquid developer. The invention also contemplates the provision of a toner metering system including a power injection device for injecting toner into the tank, a timing device for actuating the injection device, and a control arrangement for starting the timing device. The timing device and the control arrangement are preferably associated with the feed mechanism which feeds successive copy sheets to the photocopy machine, with provision for operating the timing device during selected feed cycles of the machine. The power injection device preferably includes an improved vacuum breaker valve for controlling the action of an aspirator adapted to suck toner from a toner receptacle. The invention preferably provides a non-spill toner receptacle having an outlet tube with its outer end closed by a rubber diaphragm, adapted to be pierced by a sharply pointed connecting tube. The outlet tube is preferably mounted in a flexible wall whereby the tube may be swung to bring its inner end into the lower extremity of the toner receptacle. The invention also preferably provides a reversible rubber squeegee blade having two selectively usable scraping edges.

Further objects, features and advantages of the present invention will appear from the following description, taken with the accompanying drawings, in which:

FIG. 2 is a fragmentary enlarged vertical section taken through the developer mechanism of the photocopy machine.

FIG. 3 is a plan view of the developer mechanism.

FIG. 4 is a fragmentary section taken generally along the line 4—4 in FIG. 3.

FIG. 5 is a fragmentary section taken generally along the line 5—5 in FIG. 3.

FIG. 6 is a vertical section taken generally along the line 6—6 in FIG. 3.

FIG. 7 is a bottom view of the circulating pump for the liquid developer, taken generally as indicated by the line 7—7 in FIG. 1.

FIG. 8 is a fragmentary enlarged vertical section taken generally along the line 8—8 in FIG. 3.

FIG. 9 is a fragmentary section taken generally along the line 9—9 in FIG. 8.

FIG. 10 is a fragmentary enlarged section, taken generally along the line 10—10 in FIG. 11, and showing the toner bottle in its initial condition, before being connected to the toner injection device.

FIG. 11 is an end view of the toner bottle, as shown in FIG. 10.

FIG. 12 is a fragmentary section taken generally along the line 12—12 in FIG. 10.

FIG. 13 is a fragmentary enlarged, somewhat diagrammatic section taken generally along the line 13—13 in FIG. 3.

FIG. 14 is a diagrammatic elevation showing the timing device and control arrangement for the toner injection device, the parts being shown in their initial or inactive positions.

FIG. 15 is a view similar to FIG. 14, showing the various parts in their active positions, at an intermediate point in the timing cycle.

FIG. 16 is a fragmentary diagrammatic section taken generally along the line 16—16 in FIG. 14.

Figure 1:
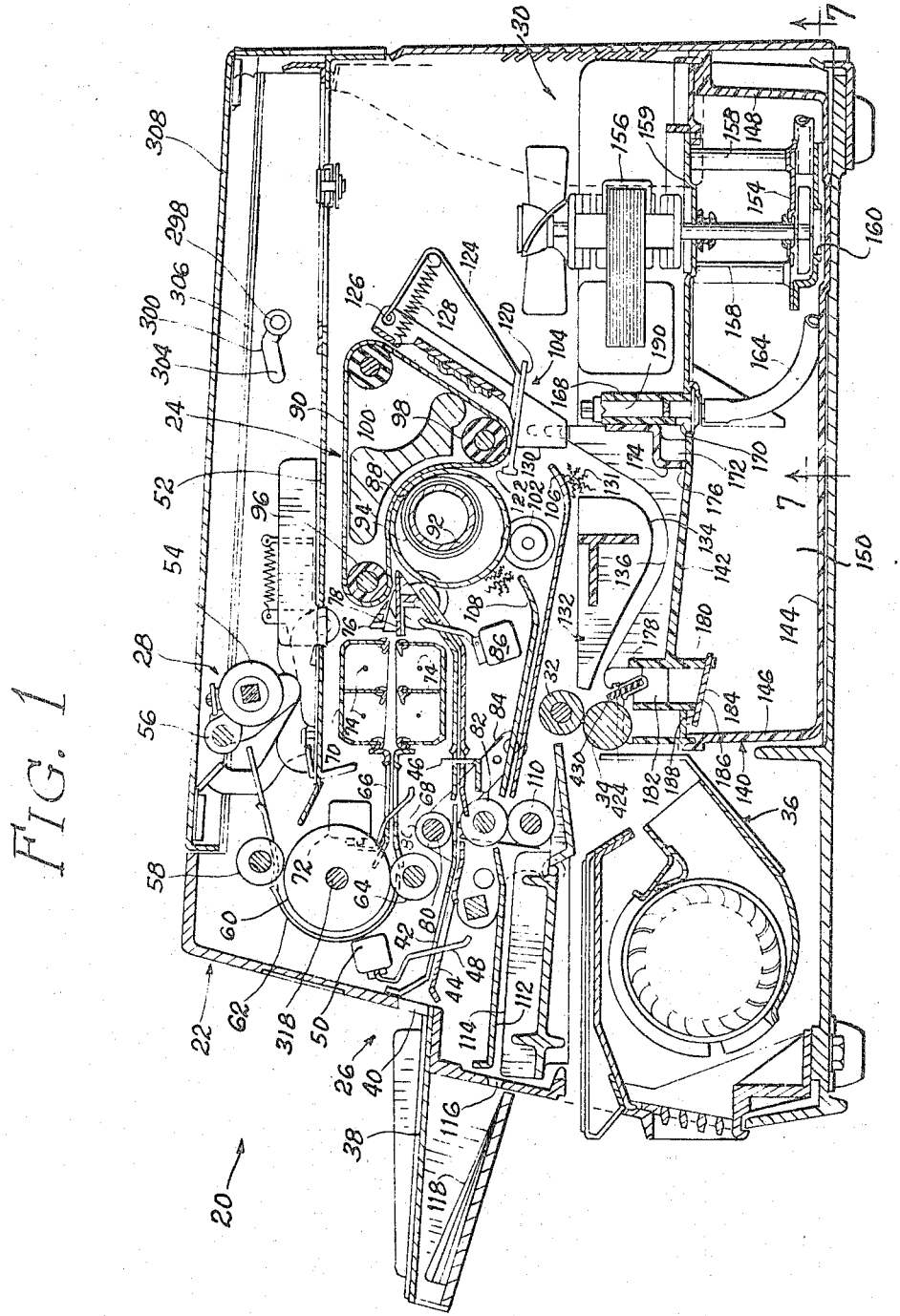
FIG. 1 is a longitudinal section taken vertically through a photocopy machine to be described as an illustrative embodiment of the present invention.

As already indicated, the drawings illustrate a photocopy machine 20, shown generally in FIG. 1. The various working parts of the machine 20 are enclosed within a housing 22 which may be opened at several points for inspection and servicing of the machine.

Generally, the photocopy machine 20 comprises an exposure device 24, an original sheet feeding mechanism 26 for feeding any desired original sheet to the exposure device 24, and a copy sheet feeding mechanism 28 for feeding successive copy sheets to the exposure device 24. The exposure device 24 is adapted to produce an electrostatic latent image of the original sheet on the corresponding copy sheet. Each copy sheet is directed from the exposure device 24 through a developer mechanism 30 which applies a liquid developer to the copy sheet. The liquid developer contains a toner which adheres to the electrostatic latent image, so as to render the image visible. The developed copy sheet passes between upper and lower squeeze rollers 32 and 34, which remove excess liquid from the sheet, and then out of the machine past a drier 36.

The feed mechanisms 26 and 28 are disclosed and claimed in the above-mentioned Mazzio and Birr application. Generally, the original sheet feeding mechanism 26 comprises a guide table 38 along which the operator directs the original sheet into the machine, through a slot 40 in the housing 22. The original sheet passes between guide plates 42 and 44 and is arrested by a movable stop 46. In traveling between the guide plates 42 and 44, the orignal sheet displaces a swingable arm 48 and thereby operates a switch 50 which initiates the operation of the copy sheet feeding mechanism 28.

The copy sheet feeding mechanism 28 comprises a feed table 52 within the housing 22 for holding a stack of the copy sheets. Rotatable feed rollers 54 are provided to feed the topmost copy sheet off the stack. The rollers 54 are initially out of engagement with the stack but are mounted on a movable carriage 56, for movement against the stack. The operation of the switch 50 causes the downward movement of the carriage 56 so that the rollers 54 engage the stack.

The topmost copy sheet is fed between rotatable forwarding rollers 58 and 60. Curved guides 62 are provided to carry the copy sheet approximately half-way around the roller 60. The sheet then passes between the roller 60 and another forwarding roller 64. The rollers 58, 60 and 64 are shown as being of a segmented or subdivided construction.

From the rollers 60 and 64, the copy sheet passes between guide plates 66 and 68 and then through a corona housing 70. In passing between the plates 66 and 68, the copy sheet operates a switch 72 which actuates the original sheet feeding mechanism 26, as will be described in greater detail shortly.

Within the housing 70, the copy sheet is subjected to a corona discharge which is produced around a plurality of electrodes 74, maintained at a high voltage. The corona discharge electrifies the copypaper, as a preliminary step to the production of the electrostatic latent image by the exposure device 24. The operation of the switch 72 also preferably initiates the corona discharge in the housing 70. From the corona housing 70, the copy sheet passes between guides 72 and 78 to the exposure device 24.

The operation of the switch 72 by the copy sheet causes the stop 46 to be withdrawn and also actuates the original sheet feeding mechanism 26, so as to feed the original sheet to the exposure device 24. The original sheet is propelled by upper and lower feed rollers 80 and 82. Initially, the original sheet passes freely between the rollers 80 and 82, which are out of engagement with each other. The upper feed roller 80 is mounted on a movable carriage 84 which is moved downwardly in response to the operation of the switch 72. As a result, the upper roller 80 presses the copy sheet against the lower roller 82, so that the sheet is propelled by the rotating rollers. The stop 46 is also preferably mounted on the movable carriage 84 so that the movement of the carriage withdraws the stop from the path of the original sheet.

The feed rollers 80 and 82 propel the original sheet between the guide plates 42 and 44 which extend to the exposure device 24. Just before reaching the exposure device 24, the original sheet operates a switch 86 which preferably is arranged to continue the production of the corona discharge in the housing 70. In this way, the corona discharge is maintained, not only until the copy sheet has passed the switch 72, but also until the original sheet has passed the switch 86.

The illustrated exposure device is adapted to superimpose the original and copy sheets, and then to expose the copy sheet to any image which is on the original sheet. As shown, the superimposed original and copy sheets are fed between a hollow transparent or translucent roller 88 and one or more endless belts 90, which press the sheets against the roller 88. A tubular lamp 92 is mounted within the transparent roller 88. The lamp 92 is preferably provided with an adjustable mask 94 for regulating the amount of exposure. As shown, the belt 90 is strung around three rollers or pulleys 96, 98 and 100, at least one of which is driven so as to advance the belt 90. The roller 88 is frictionally driven by the belt 90. After passing around the roller 96, the belt 90 passes part way around the transparent roller 88, and then moves away from the roller 88 to pass around the rollers 98 and 100. The ends of the transparent roller 88 are supported by a plurality of bearing rollers 102.

After passing through the exposure device 24, the copy sheet is separated from the superimposed original sheet by a sheet separating device 104, which is disclosed and claimed in the copending Mazzio application, Ser. No. 569,402, filed Aug. 1, 1966. To facilitate the separation of sheets, it is preferred to time the feeding of the sheets so that the leading edge of the copy sheet projects slightly beyond the leading edge of the superimposed original sheet. The sheet separating device 104 causes the copy sheet to be directed below a deflector or guide plate 106, so that the copy sheet will pass through the developer mechanism 30. The original sheet passes along the top of the deflector plate 106, and then between the plate 106 and an overlying guide plate 108. The plates 106 and 108 direct the original sheet between the roller 82 and another roller 110, which propel the original sheet between guide members 112 and 114, and then out of the housing 22 through a slot 116. A guide shelf or member 118 is provided beneath the table 38 to support the original sheet until it is removed by the operator.

The illustrated sheet separating device 104 comprises a movable finger or blade 120 which intercepts the projecting edge of the copy sheet and causes the copy sheet to be curled away from the original sheet. Preferably, the tip portion of the finger 120 has a special formation for temporarily retaining the projecting edge of the copy sheet. As shown, the tip portion is formed with a protuberance or bump 122.

The illustrated finger 120 extends transversely across the tangential path of the original and copy sheets. The finger 120 is mounted on an arm 124 which is swingable about a pivot 126. A spring 128 is connected to the arm 124 so as to bias the finger 120 into its initial position.

The leading edge of the copy sheet engages the movable finger 120 and causes it to swing about the pivot 126. The leading edge of the copy sheet is caught by the protuberance 122 so that the copy sheet moves with the finger 120. The pivot 126 is located so that the finger 120 swings downwardly and laterally to the right, as seen in FIG. 1. As a result, the copy sheet is curled away from the original sheet. In this way, the movable finger 120 directs the copy sheet below the deflector plate 106, while the original sheet is intercepted by the deflector plate.

As the finger 120 is swung laterally, the copy sheet has an increased tendency to escape from the protuberance 122. The escape of the copy sheet is assisted by a pair of strippers 130, between which the finger 120 is movable. After escaping from the protuberance 122, the copy sheet passes downwardly along the strippers 130 and into the developer mechanism 30. A strand of conductive tinsel 131 is preferably mounted on the guide plate 106, opposite the path of the copy sheet, so as to discharge a portion of the electrostatic charge on the copy sheet just before it enters the developer. It has been found that the provision of this discharging device greatly improves the quality of the developed copy. In particular, the tinsel prevents the tendency toward excessive darkness in the developed copy near the leading edge of the copy sheet. Such darkness is a serious problem without the tinsel.

In general, the developer mechanism or system 30 comprises a developer tray or trough 132 adapted to hold a quantity of a liquid developer, through which each copy sheet is moved. Upper and lower guides 134 and 136 are provided to direct the copy sheet through the liquid developer in the tray 132. The illustrated guides 134 and 136 are skeletal or ribbed in form, as shown to best advantage in FIG. 3.

The liquid developer contains a finely divided toner which adheres to the electrostatic image on the copy sheet and renders the image visible.

The developer system 30 also comprises a tank 140 adapted to hold a reserve of the liquid developer. The ilustrated tank 140 is removable from the housing 22 of the photocopy machine 20, to facilitate the occasional cleaning of the tank. Preferably, the tank 140 is substantially closed so as to prevent the liquid developer from spilling from the tank when it is being removed from or replaced in the housing 22. The closed tank also minimizes evaporation of the liquid developer. As shown, the tank 140 has top and bottom walls 142 and 144, front and rear walls 146 and 148, and a pair of lateral slide walls 150. Preferably, the tank 140 is made of a suitable plastic material. The illustrated developer tray 132 is mounted on the top wall 142 of the tank 140 and is preferably formed integrally therewith.

A pump 154 is preferably provided to circulate the liquid developer from the tank 140 into the developer tray 132. The illustrated pump 154 is of the centrifugal type and is driven by an electric motor 156. It is preferred to suspend the pump on members 158 connected to a supporting plate 159 mounted on the top wall 142, so that the pump will be submerged in the liquid developer within the tank 140. The illustrated pump 154 has an inlet opening 160 formed in its lower side.

As shown to best advantage in FIG. 7, the pump 154 preferably has three similar outlets 162a, 162b, and 162c, to which three different hoses or tubes 164, 165 and 166 are connected. The first outlet hose 164 carries the liquid developer to the developer tray 132 by way of a shut-off valve 168 (FIG. 2).

The liquid developer is directed into the lower extremity of the tray 132, to prevent any sediment from accumulating in the tray, and to provide for complete drainage of the liquid developer from the tray when the pump 154 is shut off. Thus, the valve 168 has an outlet port 170 through which the liquid developer is discharged into a transverse passage 172 extending across the width of the tray 132. The front of the passage 172 is formed by a wall 174 having a series of openings 176 therein, extending into the tray 132 at the lower extremity thereof. The liquid developer enters the tray 132 through the openings 176 and prevents any sediment from accumulating on the bottom of the tray. When the pump 154 is shut down, the liquid developer drains out of the tray 132 through the openings 176. The liquid developer then drains through the passage 172, the valve 168, the hose 164, and the pump 154 into the tank 140. Additional drain holes 177 are also preferably provided directly through the wall 142.

The level of the liquid developer in the tray 132 is determined by an overflow wall or dam 178 near the front of the tray. Because the liquid is continuously pumped into the tray 132, it rises in the tray and flows over the dam 178 into an overflow conduit or drain 180 which extends through the top wall 142 and returns the liquid developer to the tank 140. The overflow conduit 180 is generally rectangular in form and is connected to the lower extremity of a channel or trough 182 in front of the overflow dam 178.

Provision is made to prevent spillage and evaporation of the liquid developer through the overflow conduit or drain 180. Thus, the illustrated overflow conduit 180 is provided with a one-way check valve 184 which permits the flow of the liquid developer through the conduit and into the tank 140, but prevents any backflow of liquid out of the tank. The illustrated check valve 184 is in the form of a flexible resilient flap or plate which is normally seated against an oblique or inclined end surface 186 on the lower end of the overflow conduit 180. The valve plate 184 is preferably made of thin sheet metal or other flexible resilient material. One edge portion 188 of the illustrated plate 184 is secured to the lower end of the overflow conduit 180, while the remainder of the plate 184 is free to flex away from the end surface or slot 186. Normally, the valve plate 184 is held by its own resilience against the end surface 186. The weight of the liquid developer which overflows into the conduit 180 is sufficient to open the valve plate 184 so that the liquid can drain into the tank 140. However, the valve plate 184 prevents any spillage of liquid out of the tank 140 through the conduit 180. The valve plate 184 also prevents any substantial loss of vapor from the tank 140 through the overflow conduit 180. Thus, the valve plate 184 minimizes loss of the liquid developer by evaporation.

As shown in FIGS. 1, 2 and 3, the shut-off valve 168 has a rotatable valve spindle or member 190 which is provided with a handle or operating arm 192 (FIG. 3). Thus, the valve spindle 190 may readily be moved between its opened and closed positions.

The second outlet hose 165 from the developer circulator pump 154 is normally connected to a power injection device 194 (FIG. 3) for injecting or metering a toner concentrate into the liquid developer in the tank 140. The hose 165 extends upwardly through an opening 196 in the top wall 142 of the tank 140. The hose 165 fits tightly in the opening 196 to prevent any loss of the liquid developer from the tank 140.

The third outlet hose 166 (FIG. 7) from the pump 154 discharges directly into the tank 140 adjacent the bottom wall 144 thereof. The flow of the liquid developer out of the hose 166 causes vigorous agitation of the liquid developer in the tank 140, so as to prevent any accumulation of toner sediment in the bottom of the tank. The agitation keeps the toner suspended in the liquid developer.

The details of the power injection device 194 are shown to best advantage in FIGS. 3–6 and 8–13. The toner concentrate is in liquid form and is contained in a removable receptacle 198 (FIG. 8) which is illustrated as a generally cylindrical bottle 200 with a removable closure 202. Generally, the injection device 194 withdraws the toner from the bottle 200 and directs the toner into the tank 140. The injection device 194 is adapted to be actuated for a brief, timed interval so that the toner will be metered sparingly and accurately into the tank 140.

In the illustrated construction, the hose 165 is connected to the injection device 194 by means of an end fitting or coupler 204 (FIG. 13) which is readily removable from the injection device 194. The illustrated coupler 204 is in the form of an elbow and an inlet tube 206, adapted to receive the hose 165, with an outlet tube or nozzle 208, extending at right angles to the inlet tube 206. The injection device 194 has a body 209 formed with a vertical opening 210 for removably receiving the nozzle 208. A spring detent arrangement is preferably employed to retain the nozzle 208 in the opening 210. Thus, the illustrated coupler 204 is formed with detent projections 212 which are adapted to be received by detent recesses 214 in spring fingers or members 216 on the body 209.

The arrangement of the removable coupler 204 makes it easy to empty the developer tank 140. This may be done by removing the coupler 204 from the injection device 194, inserting the nozzle 208 into a bottle or other receptacle for receiving the liquid developer, closing the shut-off valve 168, and starting the electric motor 156 to run the pump 154, so that the liquid developer will be pumped into a container. The closure of the shut-off valve 168 prevents the liquid developer from being pumped into the developing tray 132.

The injection device 194 is arranged to produce a partial vacuum or suction, to suck the toner concentrate out of the bottle 200. In the illustrated construction, the suction is produced by an aspirator 218 (FIG. 13), whereby the suction is induced by the flow of the liquid developer through the injection device 194. Thus, the body 209 is formed with a bore 220 which extends downwardly from the opening 210 in which the nozzle is inserted. The bore 220 carries the liquid developer downwardly from the nozzle 208 and into the tank 140. The flow of the liquid through the bore 220 produces suction in a side passage 222 extending upwardly and laterally from the bore 220. The toner concentrate is introduced into the bore 220 through the side passage 222. Thus, the toner concentrate is mixed with the liquid developer as it flows through the bore 220.

The lower portion of the bore 220 extends through a tubular spigot or nozzle 224 adapted to extend into the tank 140 through the top wall 142 thereof. It will be seen that the top wall 142 is formed with a raised boss 226 having an opening 228 therein. A sealing grommet or ring 230 is mounted in the opening 228 to receive the spigot 224. The grommet 230 is preferably made of synthetic rubber or other rubbery material. As shown, the grommet 230 is formed with a flexible, inwardly projecting annular flange 232 adapted to form a tight seal with the outside of the spigot 224.

Provision is made for connecting the passage 222 to the interior of the toner bottle 200, so that the toner concentrate will be sucked into the passage 222. In addition, it is preferred to provide a second connection to the toner bottle 200, so that air may enter the bottle as the toner concentrate is withdrawn.

The toner receptacle 198 is of a special construction to avoid any leakage or spillage of the toner concentrate. Thus, the closure 202 for the bottle 200 incorporates at least one outlet tube 236 (FIGS. 10 and 11) through which the toner concentrate is withdrawn from the bottle 200 The illustrated closure 202 also has a second outlet tube 238 through which air is introduced into the bottle 200. As shown in FIG. 12, the tubes 236 and 238 are preferably molded integrally from synthetic rubber or other flexible resilient rubbery material.

The outlet tubes 236 and 238 extend a substantial distance into the bottle 200 through the mouth 240 (FIG. 10) thereof. Moreover, the tubes 236 and 238 extend a substantial distance beyond the outside of the bottle.

The injection device 194 is provided with connecting tubes or pipes 242 and 244 (FIG. 13) which are adapted to be connected to the outlet tubes 236 and 238. The connecting tubes 242 and 244 are adapted to be inserted into the outer ends of the tubes 236 and 238, in sealing engagement therewith (FIG. 8).

To prevent leakage or spillage of the toner concentrate, it is preferred that the tubes 236 and 238 be closed initially by diaphragms or webs 250 and 252 (FIGS. 10 and 11) made of synthetic rubber or other flexible resilient rubbery materials. The illustrated diaphragms 250 and 252 are formed integrally with the tubes 236 and 238, at intermediate points therealong.

The connecting tubes or pipes 242 and 244 are adapted to pierce the diaphragms 250 and 252 so that the pipes can be connected with the tubes 236 and 238 with great facility and without any leakage of the toner concentrate. Thus, the connecting pipes 242 and 244 are formed with sharp piercing points 254, as shown to best advantage in FIG. 8. The piercing points 254 are preferably formed by cutting off the ends of the tubes 242 and 244 on the diagonal. When the toner bottle is removed, the pierced diaphragms spring back to their original positions so as to reseal the toner bottle. This resealing action prevents any remaining toner from leaking from the bottle.

The illustrated toner bottle 200 is mounted horizontally on the injection device 194. A holder in the form of a wire clip 256 is provided to support the bottle 200.

Preferably, the outlet tubes 236 and 238 are swingably mounted in the closure 202 so that the inner ends of the outlet tubes may be swung into the lower extremity of the bottle 200, as shown in FIG. 8, when it is mounted on the injection device 194. In the illustrated construction, the closure 202 comprises a flexible resilient end wall or disc 258 which supports the outlet tubes 236 and 238. As illustrated, the tubes 236 and 238 are formed integrally with the disc 258, which is made of synthetic rubber or other rubbery material. In effect, the tubes 236 and 238 are mounted and extend through the flexible disc 258.

It will be seen that the disc 258 is adapted to cover the mouth 240 of the bottle 200. The closure 202 comprises a ring 260 which screws onto the bottle 200 and is formed with an annular flange 262 for clamping the disc 258 against the open end of the bottle 200. As illustrated, a washer 264 is interposed between the flange 262 and the disc 258.

The connecting pipes 242 and 244 are mounted in the body 209 and extend downwardly therefrom at an inclined angle, corresponding to the desired angle of the outlet tubes 236 and 238. When a new toner bottle 200 is to be installed, the body 209 of the injection device 194 is lifted upwardly from the tank 140, and the piercing pipes 242 and 244 are thrust through the diaphragms 250 and 252 and into the outlet tubes 236 and 238. While this is being done, the bottle 200 is held at an inclined angle, as shown in broken lines in FIG. 8. The bottle 200 is then swung upwardly into a horizontal position and is snapped into the wire clip 256. The flexible resilient disc 258 permits such swinging movement of the bottle. As a result, the outlet tubes 236 and 238 are effectively swung into the lower extremity of the bottle 200, so that virtually all of the toner concentrate can be sucked out of the bottle.

As shown to best advantage in FIGS. 8 and 13, the connecting pipes 242 and 244 are mounted in inclined openings 266 and 268 in the body 209. The opening 266 connects with the inclined passage 222, so that the suction produced by the aspirator 218 is transmitted to the outlet tube 236. The other inclined opening 268 communicates with a passage 270 in the body 209, communicating with the atmosphere, so that air can enter the toner bottle 200 through the tube 238.

Provision is made for controlling the withdrawal of the toner concentrate from the bottle 200 and the injection of the concentrate into the developer tank 140. Preferably, this is accomplished by means of a vacuum breaker valve 272 (FIG. 8) which controls the application of the suction to the outlet tube 236, leading into the toner bottle 200. As illustrated, the vacuum breaker valve 272 comprises a passage 274 which extends in the body 209 between the suction passage 222 and the atmosphere. Normally, the passage 274 is open, so that the suction is broken. Under such conditions, the toner concentrate is not withdrawn from the bottle 200. A movable valve member 276 is provided to close the outer end of the passage 274, whereupon the suction produced by the aspirator 218 is effective to withdraw the toner concentrate from the bottle 200 and into the stream of liquid developer which flows through the bore 220 into the tank 140. The illustrated valve member 276 is in the form of a flat plate adapted to engage a seat member 278 which is provided at the outer end of the passage 274. The seat member 278 is preferably in the form of a frusto-conical cup or ring made of rubber or other flexible resilient rubbery material. A tubular extension 280 is formed on the body 209 to support the annular cup-shaped seat member 278. The extension 280 is formed with a groove 282 to retain the reduced lower end of the cup-shaped member 278.

The flat valve member 276 is adapted to form a tight seal with the flexible cup-shaped seat member 278. As shown, the valve member 276 comprises the outer portion of a swingable armature 284 which is adapted to be operated by a solenoid 286. The armature 284 is swingably mounted on a bracket 288 which also supports the core 290 of the solenoid. The armature 284, bracket 288 and core 290 are preferably made of steel or some other suitable magnetic material.

The valve member 276 and the armature 284 are biased away from the seat member 278 and the core 290. Such biasing action is preferably provided by a spring 292, connected between the armature 284 and the bracket 288.

As shown to best advantage in FIGS. 14, 15 and 16, a timing device 296 is preferably provided for controlling the actuation of the toner injection device 194. In this way, the toner injection device 194 is operated for a brief, accurately timed interval, so that the toner concentrate is injected accurately and sparingly into the liquid developer in the tank 140. In the illustrated machine, the timing device 296 is adapted to be started manually by the operator, whenever it becomes apparent that additional toner is needed in the liquid developer. Thus, the timing device 296 comprises a manually movable control meber 298 (FIGS. 14 and 15) in the form of a handle or pin which is movable along a curved slot 300. It will be seen that the slot 300 has low portions 302 and 304 at its opposite ends and a high portion 306 at an intermediate point, so that the manually movable pin 298 tends to be detained in both end portions. In FIG. 14, the control pin 298 is in its inactive position, in the end portion 302 of the slot 300, in which the timing device 296 is shut off. As shown in FIG. 15, the pin 298 has been moved to its active position, in the end portion 304.

As shown in FIG. 1, the control member or pin 298 is disposed within the housing 22, adjacent the feed table 52 for the copy sheets. The pin 298 is accessible by raising a hinged cover 308 on the housing 22. The copy sheets are also inserted by raising the cover 308. The location of the pin 298 under the cover 308 tends to discourge operation of the control pin 298 by persons other than the authorized operator.

It is preferred to coordinate the operation of the timing device 296 with the operation of the feed mechanism 28 for the copy sheets. Thus, when the control pin 298 is actuated, the timing device 296 is conditioned so that it will go through its timing cycle during the next feed cycle of the feed mechanism 28.

As already indicated, the copy sheet feeding mechanism 28 is disclosed and claimed in the above-mentioned Mazzio and Birr application. The movement of the carriage 56 for the feed rollers 54 is controlled by a cam 310 (FIGS. 14 and 15) which is engaged by a cam follower roller 312 mounted on a lever 314. The carriage 56 is connected to the lever 314 and is adapted to swing therewith.

Initially, the cam 310 is stationary, as shown in FIG. 14. FIGS. 14, 15 and 16 illustrate a mechanism 316 for causing the cam 310 to rotate through a single revolution. In this way, the feed rollers 54 are lowered momentarily against the copy sheets, and then are raised again, so that only one copy sheet will be fed.

The mechanism 316 takes the form of a single cycle clutch mechanism, whereby the cam 310 is adapted to be coupled to a shaft 318 by a clutch 320 (FIG. 16). The shaft 318 also supports the forwarding roller 60 and is continuously rotated. The clutch 320 is of the known type in which a helical spring 322 forms a frictional driving connection between a hub 324 and another hub 326, unless a sleeve 328 is held in a stationary position, in which case the clutch slips. It will be seen that the hub 324 is connected to the shaft 318, while the sleeve 328 is connected to the cam 310.

A movable pawl or dog 330 (FIGS. 14 and 15) is provided to hold back the sleeve 328, which is formed with a notch or opening 332 for receiving the pawl. The illustrated pawl 330 is formed on a lever 334 which is swingable about a pivot 336. A spring 338 is connected to the lever 334 to bias the pawl 330 against the sleeve 328 and into the notch 332.

Power means are provided for releasing the pawl 330 from the notch 332 so that the cam 310 will be rotated through a single revolution. As shown, such means comprise a solenoid 340 having a movable armature 342. To provide for momentary releasing movement of the lever 334, the armature 342 is arranged to operate an escapement 344, comprising a lever or link 346, mounted on the armature 342 by means of a pivot 348. The lever 346 is formed with a pawl or tooth 350 which is initially engaged with an ear or flange 352 on the lever 334. A return spring 354 is connected to the lever 346 to bias the lever and the armature 342 in an upward direction. The upward movement of the armature 342 is limited by a stop flange 356 which is formed on a mounting bracket 358. It will be seen that the mounting bracket 358 supports the solenoid 340. The lever 346 has an upper arm 360 on which the tooth 350 is formed and also a laterally projecting arm 362 which is engageable with a stop 364 on the mounting bracket 358.

When the solenoid 340 is energized, the armature 342 and the lever 346 are pulled downwardly against the biasing action of the spring 354. The tooth 350 pulls the ear 352 downwardly and thus swings the lever 334 counter-clockwise so that the pawl 330 is disengaged from the notch 332. The lateral arm 362 thereupon engages the stop 364 and is swung counter-clockwise, with the result that the tooth 350 escapes from the ear 352, as shown in FIG. 15. In this way, the lever 334 is released so that the pawl 330 returns into engagement with the sleeve 328. As soon as the cam 310 completes one revolution, the pawl 330 enters the notch 332 and stops the sleeve 328 and the cam 310.

The solenoid 340 is preferably connected in circuit with the switch 50, so that the solenoid is energized when the switch is operated by the insertion of the original sheet. Thus, insertion of the original sheet initiates the operation of the copy sheet feeding mechanism 28.

The timing device 296 for the toner injection device 194 preferably comprises another cam 370 which is rotatable with the cam 310. The illustrated cam 370 is adjustable in that it comprises two cam discs 372 and 374 which are normally clamped together by means of screws 376. A follower roller 378 is provided to engage the adjustable cam 370. It will be seen that the roller 378 is mounted on a lever 380 which is swingable about a pivot 382. A spring 384 is connected to the lever 380 to bias the follower roller 378 toward the cam 370.

However, the roller 378 is initially held away from the cam 370 by another lever 386, also swingable about the pivot 382. The lever 386 carries an ear or flange 388 which is engageable with the lever 380.

The lever 386 is adapted to be operated by the control pin or member 298. For this purpose, a link 390 is connected between the pin 298 and the lever 386. When the pin 298 is moved to its inactive position, in the end portion 302 of the slot 300, the lever 386 is swung counter-clockwise so that the ear 388 displaces the lever 380 in a counter-clockwise direction, and thereby holds the roller 378 away from the cam 370.

An over-center spring 392 is preferably provided to hold the lever 386 in its inactive position. As shown, the spring 392 is connected between the ear 388 and an anchoring pin 394, which also serves as a stop for an ear or flange 396 on the lever 386.

When the control pin 298 is moved to its active position in the end portion 304 of the slot 300, as shown in FIG. 15, the lever 386 is swung clockwise so that the ear 388 is moved away from the cam follower lever 380.

The spring 392 moves over the center of the pivot 382 and thereby tends to hold the lever 386 in its active position.

The movement of the lever 386 and the ear 388 releases the cam follower lever 380 so that the roller 378 engages the adjustable cam 370. When the solenoid 340 is next energized, the cam 370 rotates through one revolution, along with the cam 310. Initially, the roller 378 engages the high part or lobe 398 of the cam 370. As the cam 370 is rotated, the roller 378 comes into engagement with the low part 400 of the cam 370, so that the lever 380 is swung clockwise by the spring 384. Such movement of the lever 380 operates a switch 402, which has an arm 404 engageable by a pin 406 on the lever 380. Further rotation of the cam 370 causes the lever 380 to return in a counter-clockwise direction, so that the switch 402 is no longer actuated. Thus, the switch 402 is actuated for a brief interval, the length of which is adjustable by adjusting the relative positions of the two discs 372 and 374 of the cam 370.

The switch 402 is connected in circuit with the valve solenoid 286 of the toner injection device 194. Thus, the closure of the switch 402 energizes the solenoid 286 so that the valve 272 is closed for a brief, accurately timed interval. During this interval, a small amount of the toner concentrate is drawn from the toner bottle 200 and is injected or metered into the liquid developer tank 140.

The lever 386, which starts the timing device 296, is automatically reset to its inactive position. In the illustrated mechanism, this is accomplished by the cam 310, which is engageable with a follower roller 408 on the lever 386. As shown in FIG. 15, the follower roller 408 is engaging the low part of the cam 310. During the revolution of the cam 310, the high part engages the roller 408 and returns the lever 386 to its inactive position, in which it is retained by the overcenter spring 392. The ear 388 engages the lever 380 and causes the roller 378 to move away from the adjustable cam 370. Thus, the mechanism is restored to its initial condition, as shown in FIG. 14.

Whenever the operator moves the control pin 298 to its active position, the timing device 296 is conditioned for operation. The timing device 296 goes through its cycle of operation when the next original sheet is inserted into the machine. The timing device 296 is automatically reset to its inactive position, so that it goes through only one timing cycle.

It is preferred to provide a device or gauge 410 to indicate the level of the liquid developer in the tank 140. As shown in FIG. 2, the gauge 410 comprises a float 412 mounted on a lever 414 which is swingable about a pivot 416. The lever 414 has an indicator arm 418 which projects upwardly through a slot 420 in the top wall 142 of the tank 140. The position of the arm 418 indicates the level of the liquid developer in the tank 140.

As already indicated, the squeeze rollers 32 and 34 remove the excess liquid developer from the copy sheets. As shown, a squeegee blade 424 (FIG. 2) is provided to scrape the liquid developer off the roller 34. The squeegee blade 424 is made of synthetic rubber or other resilient rubbery material. To support the squeegee blade 424, the developer system 30 is provided with a bar or holder 426 which is formed with a slot 428. The squeegee blade 424 is preferably in the form of a rectangular bar which is mounted in the slot 428. The blade 424 has two longitudinal edges 420, both of which are usable to scrape the liquid developer from the roller 34. By reversing the position of the blade 424, the two edges 430 can be used successively. In this way, the effective life of the squeegee blade 424 can be greatly prolonged.

The squeegee blade 424 and its supporting bar 426 are mounted over the overflow channel or trough 182. Thus, the liquid developer scraped off the roller 34 by the squeegee blade 424 is directed into the channel 182, from which it drains through the overflow drain conduit 180 into the tank 140.

While the operation of the machine 20 has been described, it may be helpful to offer a brief summary. Initially, the tank 140 (FIG. 1) is filled with liquid developer, which is introduced into the trough 132. Alternatively, the spigot 224 (FIG. 13) may be removed from the grommet 230 so that the tank 140 may be filled through the grommet. A fresh toner bottle 200 (FIG. 8) may be connected to the toner injection unit 194 by causing the connecting pipes 242 and 244 to pierce the diaphragms 250 and 252. The toner bottle is then swung upwardly and is snapped into the clip 256. The swinging movement of the bottle brings the outlet tubes 236 and 238 into the lower extremity of the bottle 200.

When the machine 20 is running, the motor 156 (FIG. 1) is energized so that the pump 154 continuously pumps the liquid developer into the developing tray 132, through the hose 164, the shut-off valve 168, and the openings 176. The liquid developer flows over the dam 178 and into the overflow channel 182, from which it drains into the tank 140 through the overflow conduit 180. The flexible check valve 184 permits the liquid developer to drain out of the conduit 180, but prevents any spillage or backflow of the liquid developer out of the tank through the conduit. The pump 154 also causes flow of the liquid developer directly into the bottom of the tank 140 through the outlet hose 166 (FIG. 7). In this way, the liquid developer is constantly agitated, producing a higher triboelectric charge on toner particles, so that the deevloping action is improved.

Some of the liquid developer is also pumped through the hose 165 into the toner injection device 194 (FIG. 13). The liquid developer passes from the nozzle 208 through the bore 220 of the aspirator 218 and into the tank 140.

The aspirator 218 produces suction, but initially the suction is dissipated because the vacuum breaker valve 272 is open. Thus, the suction is insufficient to draw the toner concentrate out of the toner bottle 200. When the original sheet is inserted through the slot 40 (FIG. 1) and between the guide plates 42 and 44, it operates the switch 50. As a result, the solenoid 340 (FIG. 14) is energized, so as to start the copy sheet feeding mechanism 28. If the control pin 298 has previously been moved to its active position by the operator, the energization of the solenoid 340 also starts the timing device 296 for the toner injection unit 194.

The solenoid 340 operates the successive levers 346 and 334. The lever 346 then escapes from the lever 334, as shown in FIG. 15, so that the lever 334 returns to its original position. The momentary displacement of the lever 334 disengages the pawl 330 from the notch 332, so that the cams 310 and 370 rotate through one revolution.

The rotation of the cam 310 causes the carriage 56 (FIG. 1) to move down so that the feed rollers 54 engage the topmost copy sheet on the feed table 52. As a result, the copy sheet is fed to the exposure device 24 by way of the rollers 58, 60 and 64 and the corona housing 70.

If the control pin 298 has previously been moved to its active position, as shown in FIG. 15, the rotation of the adjustable cam 370 causes the lever 380 to swing clockwise, and then return counter-clockwise, so that the switch 402 is operated for a brief, accurately timed interval. The cam 310 then engages the roller 408 and resets the lever 386 and the pin 298 to their original positions, in which the ear 388 prevents the oscillation of the lever 380 by the cam 370.

The closure of the switch 402 energizes the solenoid 286 (FIG. 8) and thereby closes the vacuum breaker valve 272. The flat valve member 276 forms a tight seal against the cup-shaped rubber seat 278. With the vacuum breaker valve 272 closed, the suction produced by the aspirator 218 (FIG. 13) draws the toner concentrate out of the toner bottle 200 and into the stream of liquid developer which flows downwardly into the tank 140. Inasmuch as the solenoid 286 is energized for only a brief, accurately timed interval, the toner concentrate is metered sparingly into the liquid developer.

Whenever the control pin 298 is moved to its active position by the operator, a single shot of the toner concentrate is metered into the developer tank 140 when the next original sheet is inserted into the machine. This system provides for convenient injection of the toner concentrate, while tending to prevent the injection of an excessive amount of the toner concentrate.

As the copy sheet is fed to the exposure device 24 (FIG. 1), it operates the switch 72, which starts the feed mechanism 26 for the original sheet. As a result, the rollers 80 and 82 feed the original sheet to the exposure device 24, where the original sheet and the copy sheet are superimposed. The sheets pass between the transparent roller 88 and the belt 90 and are exposed to the light from the lamp 92. As a result, an electrostatic latent image is produced on the front or coated side of the copy sheet.

The separating device 104 separates the copy sheet from the original and causes the copy sheet to travel into the developing tray 132. The tinsel 131 brushes against the back of the copy sheet and discharges a portion of the charge therefrom. The guides 134 and 136 direct the copy sheet through the liquid developer in the tray 132, and then between the squeeze rollers 32 and 34. The copy sheet moves past the drier 36 and out of the machine.

The squeegee blade 424 scrapes the liquid developer off the rollers 34. From time to time, the squeegee blade 424 may be repositioned so that the two scraping edges 430 will be used. In this way, the effective life of the squeegee blade is greatly prolonged.

When the pump 154 is stopped, the liquid developer drains out of the tray 132 through the openings 176, and then through the shut-off valve 168, the hose 164 and the pump 154 into the tank 140. The liquid developer also drains out of the drain holes 177 (FIG. 2).

After the tank 140 has been removed from the machine, the pump 154 may be used to empty the tank 140, by closing the shut-off valve 168 and detaching the coupler 204 (FIG. 13) from the toner injection unit 194, so that the nozzle 208 may be inserted into a suitable bottle or other receptacle for receiving the liquid developer from the tank 140.

Various other modifications, alternative constructions, and equivalents may be employed without departing from the true spirit and scope of the invention, as exemplified in the foregoing description and defined in the following claims.

We claim:
1. A photocopy developing device,
comprising the combination of a tray for holding a quantity of liquid developer,
a substantially closed tank for holding a reserve supply of the liquid developer,
said tank having top, bottom and side walls,
said tray being mounted on said top wall,
a pump having an inlet connected to said tank and an outlet connected to said tray for pumping the liquid developer from said tank to said tray,
a shut-off valve in said outlet between said pump and said tray,
an overflow conduit leading from said tray to said tank for returning the liquid developer to said tank,
and a check valve for preventing the flow of liquid out of said tank through said overflow conduit,
said check valve preventing evaporation of liquid from said tank while also preventing liquid from spilling out of said tank.
2. A device according to claim 1,
in which said check valve comprises a resilient flap for closing the discharge end of said overflow conduit.
3. A device according to claim 1,
in which said overflow conduit is provided with an oblique end portion,
said check valve comprising a thin resilient sheet metal plate normally engaging and closing said oblique end portion of said overflow conduit,
said plate being adapted to be opened by the weight of the liquid developer in said overflow conduit.
4. A photocopy developing device,
comprising a tray for holding a quantity of liquid developer,
a tank for holding a reserve supply of the liquid developer,
a pump for circulating the liquid developer between said tank and said tray,
a power injection device for injecting a toner into the liquid developer in said tank,
and a timing device for momentarily actuating said power injection device for a timed interval,
said power injection device comprising a receptacle for holding a supply of the toner,
an aspirator for sucking the toner from said receptacle,
means for directing some of the liquid developer from said pump through said aspirator to create suction therein,
and a vacuum breaker valve connected to said aspirator and operable by said timing device.
5. A device according to claim 4,
in which said vacuum breaker valve comprises a valve seat having port connected to said aspirator,
a solenoid,
and a flap plate operable by said solenoid and movable into engagement with said seat for closing said port.
6. A device according to claim 5,
in which said seat comprises a flexible cup-shaped rubbery member.
7. A photocopy developing device,
comprising a tray for holding a quantity of liquid developer,
a tank for holding a reserve supply of the liquid developer,
a pump for circulating the liquid developer between said tank and said tray,
a power injection device for injecting a toner into the liquid developer in said tank,
a timing device for momentarily actuating said power injection device for a timed interval,
said timing device comprising first and second rotatable cams,
means for causing said cams to rotate through a single revolution,
a first cam follower engageable with said first cam for operating said power injection device,
a control member movable between inactive and active positions,
said control member having an element thereon operative in said inactive position to hold said follower away from said first cam,
and a second follower operable by said second cam for returning said control member from said active to said inactive position.
8. A device according to claim 7,
including an electrical switch operable by said first follower for actuating said power injection means.
9. A device according to claim 7,
including means for manually moving said control member between said inactive and active positions.
10. A photocopy machine,
comprising the combination of an exposure device,
a feed mechanism for feeding copy sheets to said exposure device, a developing device for receiving the copy sheets from said exposure device, said developing device including a receptacle for holding liquid developer, a power injection device for injecting a toner into the liquid developer, a single cycle mechanism for operating said feed mechanism through a single feed cycle, a timing device for controlling said power injection device, selectively operable means for connecting said timing device to said single cycle mechanism for operating said timing device through a single timing cycle, said timing device comprising first and second cams, said single cycle mechanism including means for rotating said cams through a single revolution, a first cam follower engageable with said first cam for operating said power injection device, said selectively operable means including a control member movable between inactive and active positions, said control member having an element thereon operative in said inactive position to hold said first follower away from said first cam, and a second follower operable by said second cam for returning said control member from said active to said inactive position.

11. A photocopy machine, comprising the combination of an exposure device, a feed mechanism for feeding copy sheets to said exposure device, a developing device for receiving the copy sheets from said exposure device, said developing device including a receptacle for holding liquid developer, a power injection device for injecting a toner into the liquid developer, single cycle means for operating said feed mechanism through a single feed cycle, a timing device operative to actuate said power injection device for a timed interval, first selectively operable control means for causing operation of said single cycle means, second selectively operable control means operable between inactive and active conditions, said second selectively operable control means being operative in said active condition to condition said tuning device for operation by said single cycle means during the next operating cycle thereof, and means operable by said single cycle means for resetting said second selectively operable control means from its active condition to its inactive condition.

12. A photocopy developing device, comprising the combination of a tank for holding a quantity of liquid developer, an injection device for injecting toner into said tank, said injection device including a receptacle for holding a supply of the toner, a closure on said receptacle and including an outlet tube extending between the inside and the outside of said receptacle to carry the toner therefrom, a rubbery diaphragm initially closing said outlet tube, and a connecting tube on said injection device and having a point for piercing said diaphragm to form a sealed joint with said outlet tube.

13. A device according to claim 12, in which said closure comprises a second tube for admitting air to said receptacle, a second rubbery diaphragm for closing said second tube, said injection device including a second connecting tube with a point for piercing said second diaphragm.

14. A device according to claim 12, in which said closure comprises a flexible resilient wall, said outlet tube being mounted in said wall, said flexible resilient wall providing for swinging movement of said outlet tube to bring the inner end thereof into the lower extremity of said receptacle.

15. A device according to claim 12, in which said receptacle is in the form of a generally cylindrical bottle, said injection device including means for removably supporting said bottle in a generally horizontal position, said closure including a flexible rubbery wall supporting said outlet tube for swinging movement to bring the inner end thereof into the lower extremity of said bottle.

16. A device according to claim 15, in which said connecting tube is inclined downwardly to hold said outlet tube in a downwardly inclined position.

References Cited

UNITED STATES PATENTS

| 2,814,062 | 11/1957 | Greisen | 15—245 |
|---|---|---|---|
| 2,852,798 | 9/1958 | Grossfeld | 15—245 |
| 3,062,123 | 11/1962 | Limberger | 95—89 |
| 3,192,897 | 7/1965 | Young | 355—10 |
| 3,245,330 | 4/1966 | Okishima | 355—10 |
| 3,330,196 | 7/1967 | Chen et al. | 95—89 |
| 3,382,783 | 5/1968 | Chen | 95—89 |
| 3,386,123 | 6/1968 | Oishei et al. | 15—250.36 |

NORTON ANSHER, Primary Examiner

R. M. SHEER, Assistant Examiner

U.S. Cl. X.R.

95—89; 118—637